Aug. 6, 1968
N. L. BERKOWITZ
3,395,557
KEY-OPERATED AND PERMUTATION LOCK WITH KEY-CONTROLLED
DISMOUNTING AND COMBINATION CHANGE
Filed Aug. 17, 1966
9 Sheets-Sheet 1
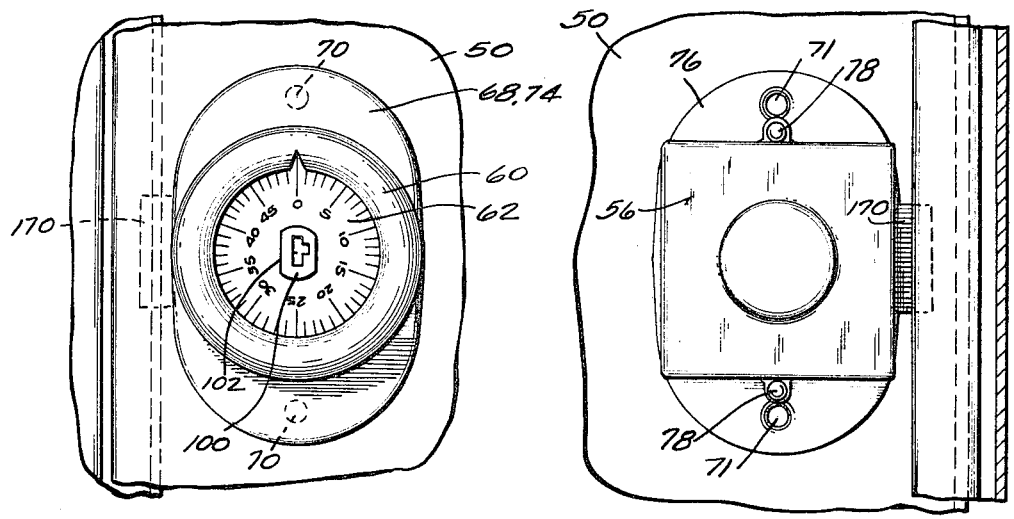
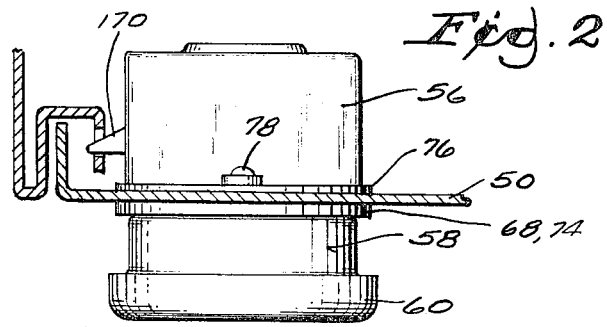
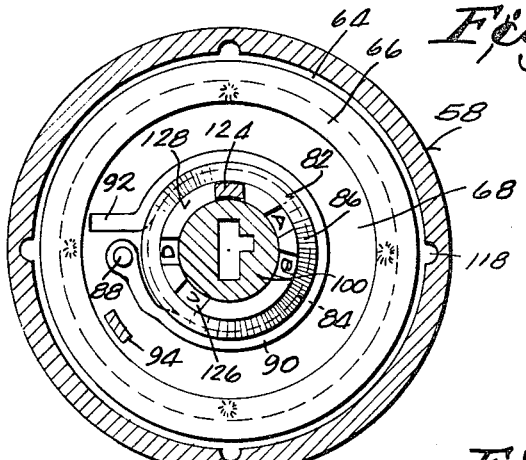
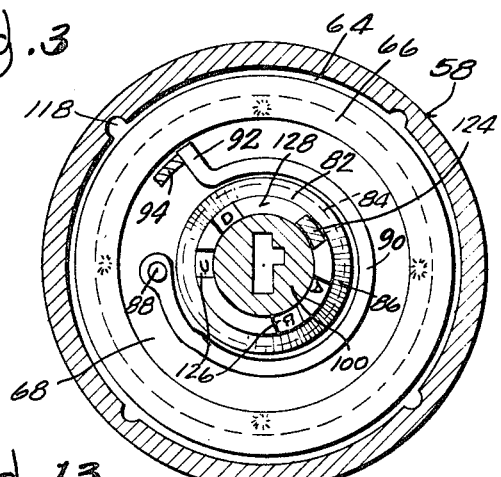
INVENTOR
NATHAN L. BERKOWITZ
BY Wheeler, Wheeler, House & Clemency
ATTORNEYS

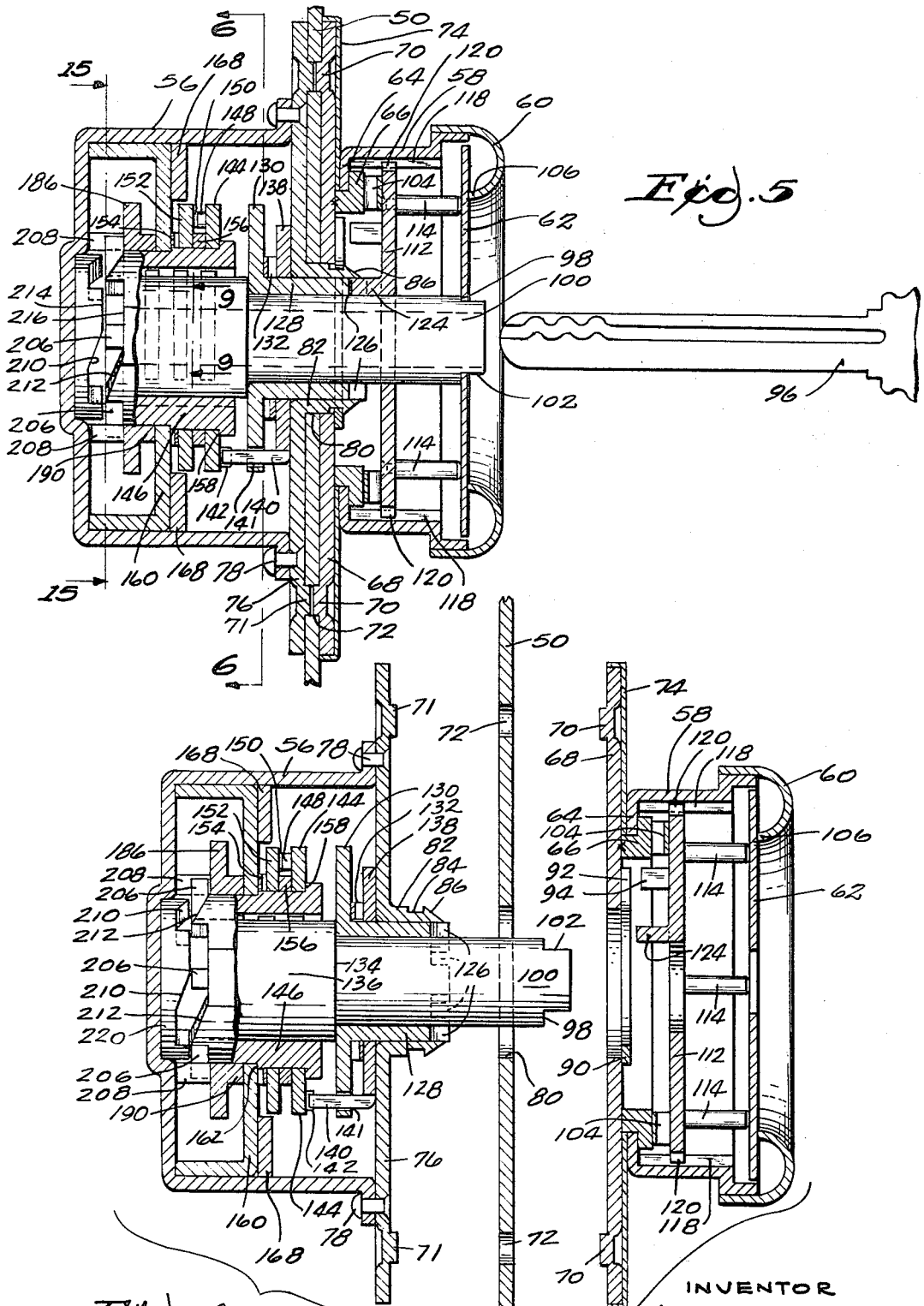

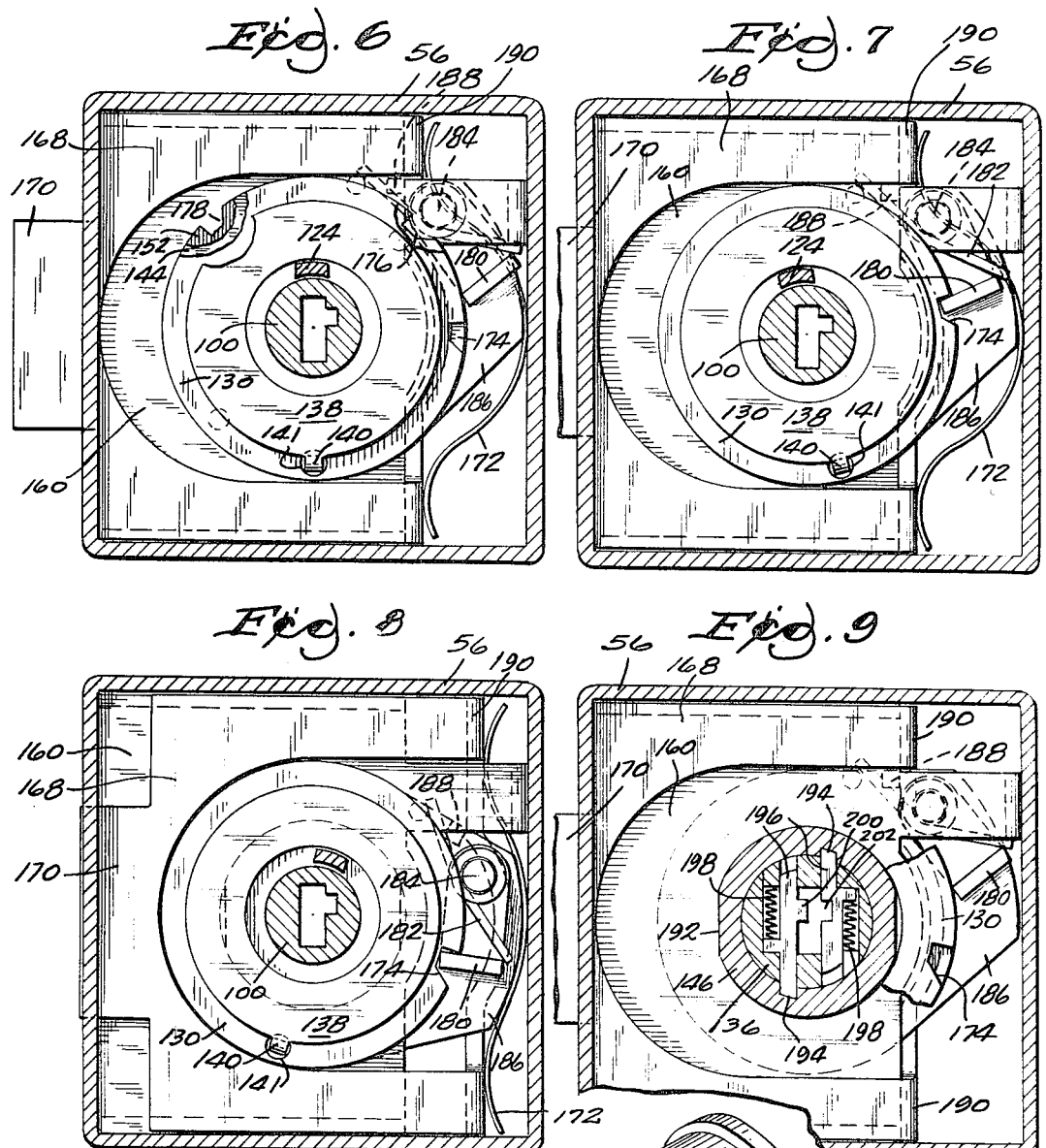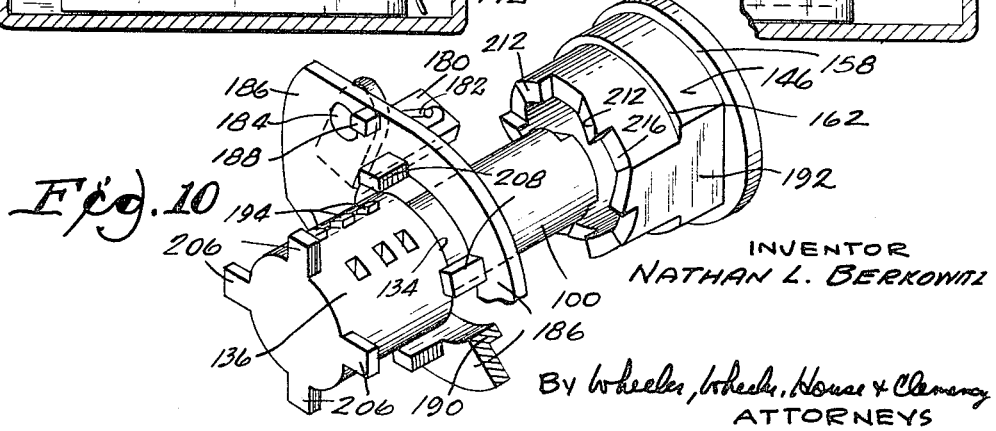

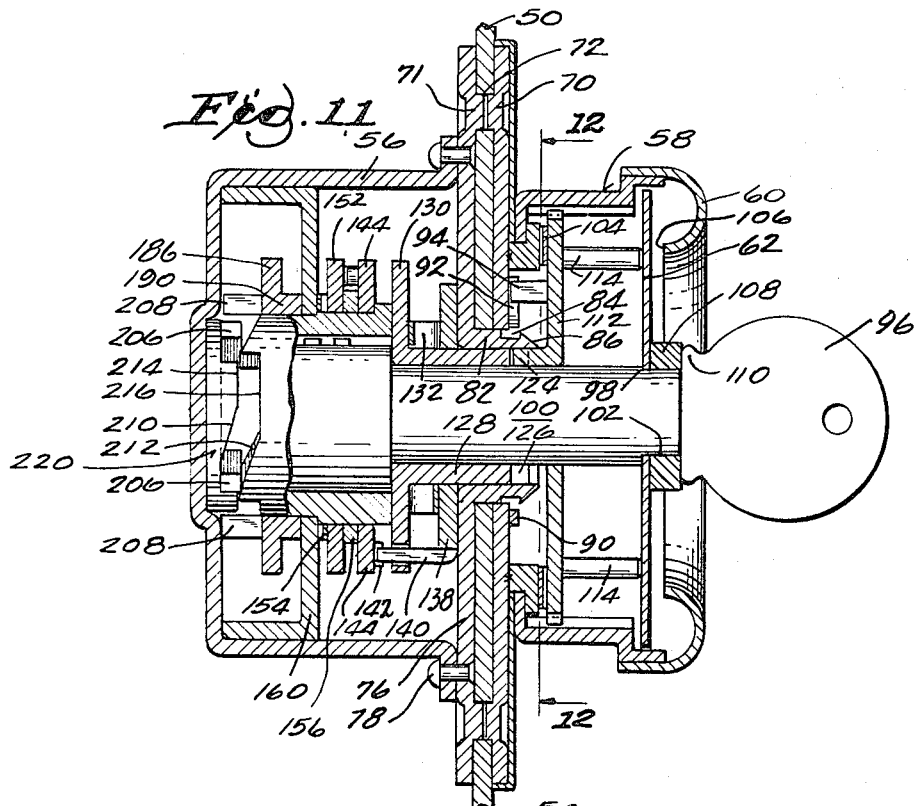

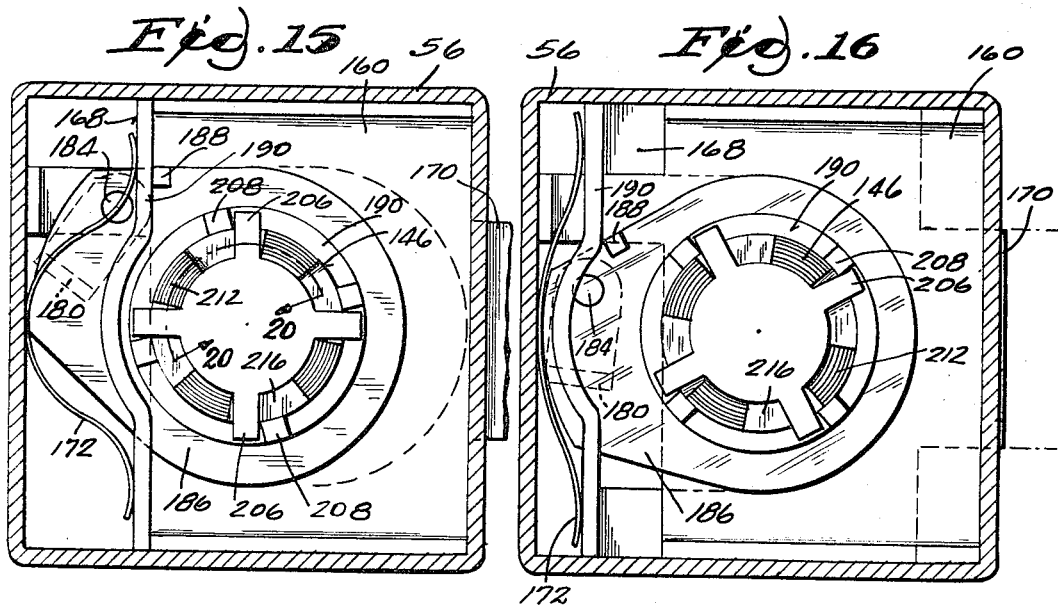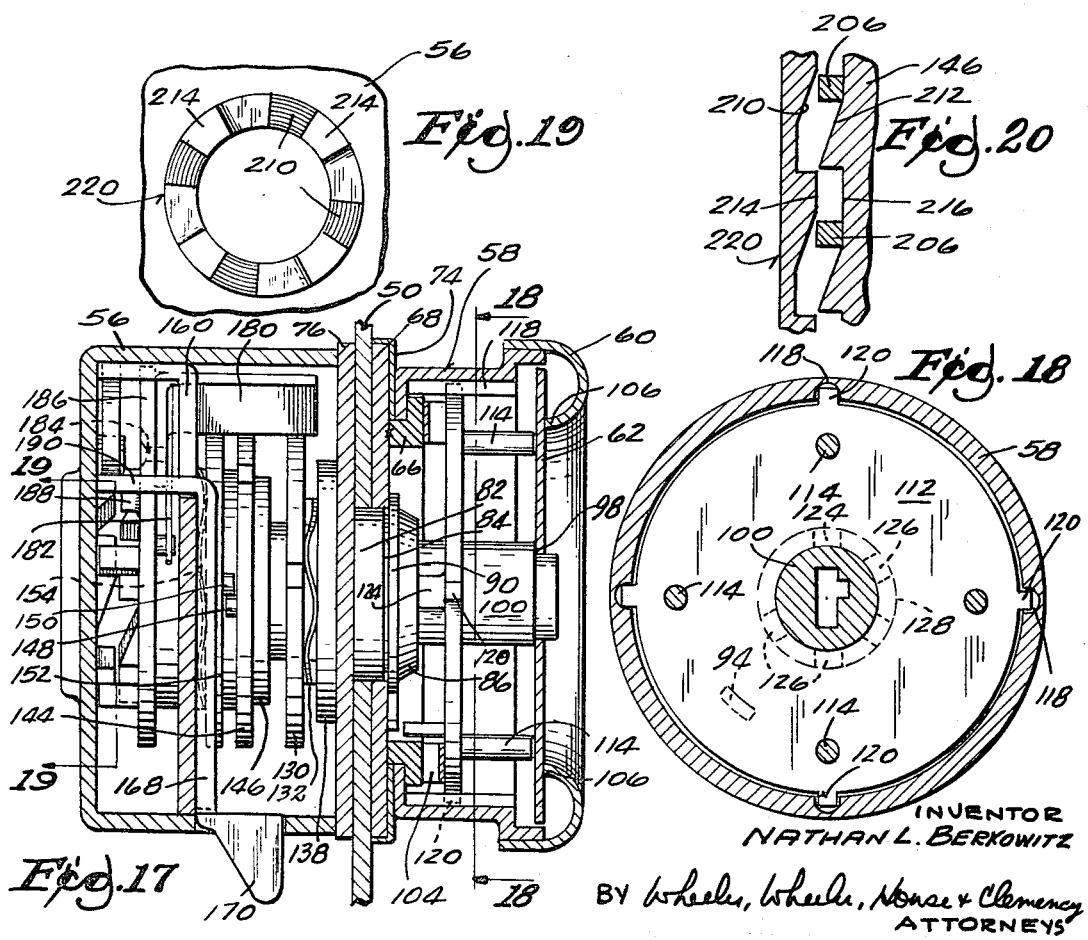

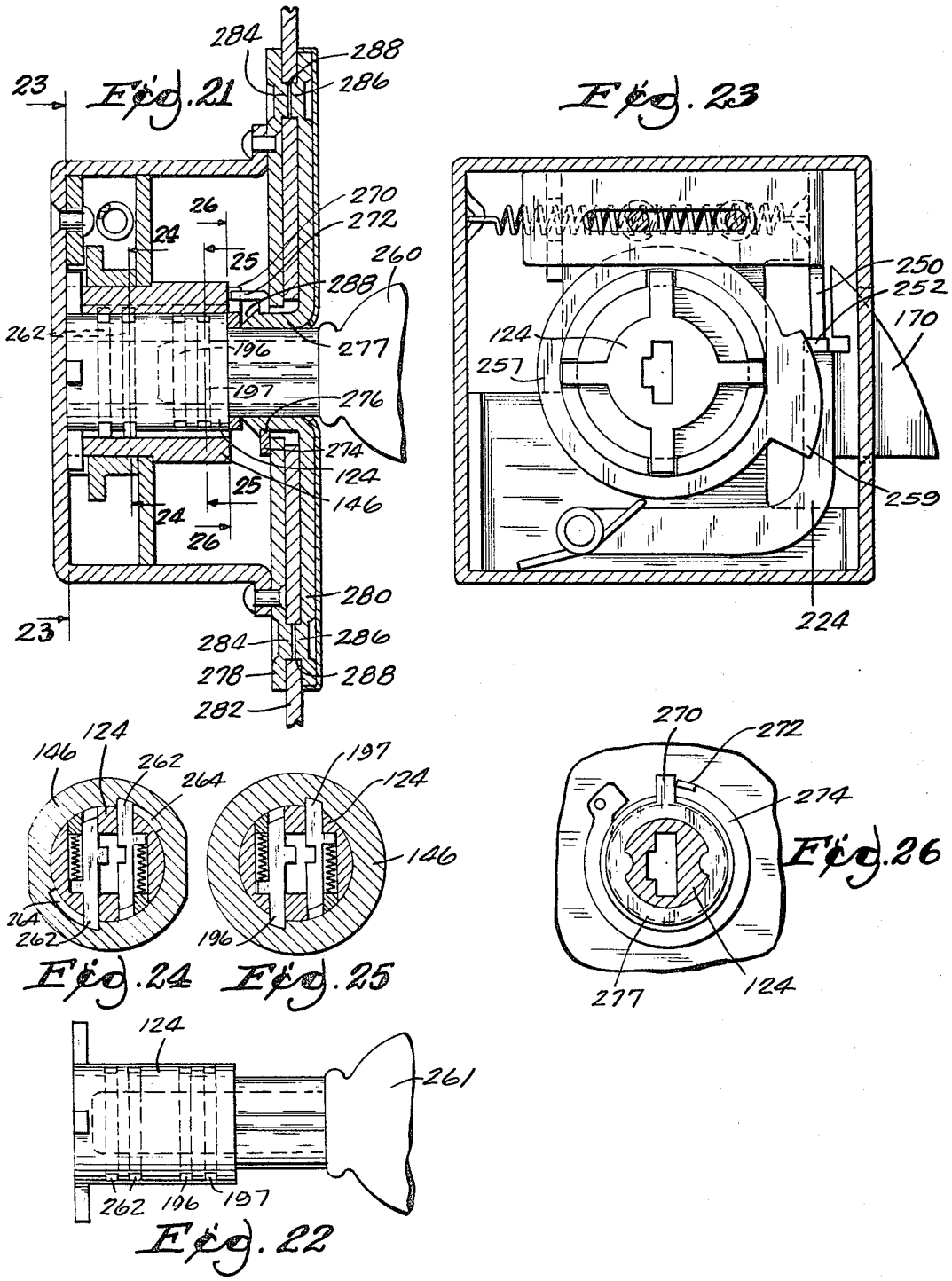

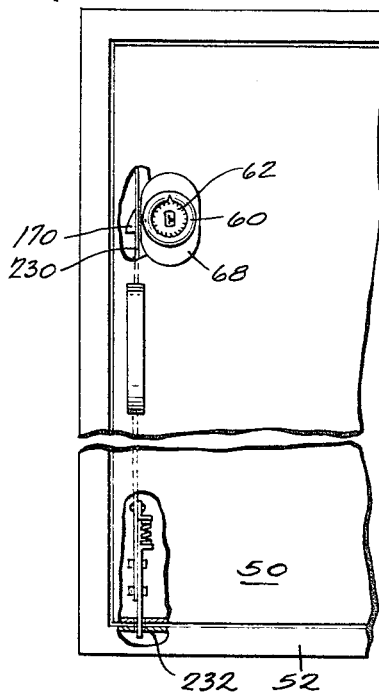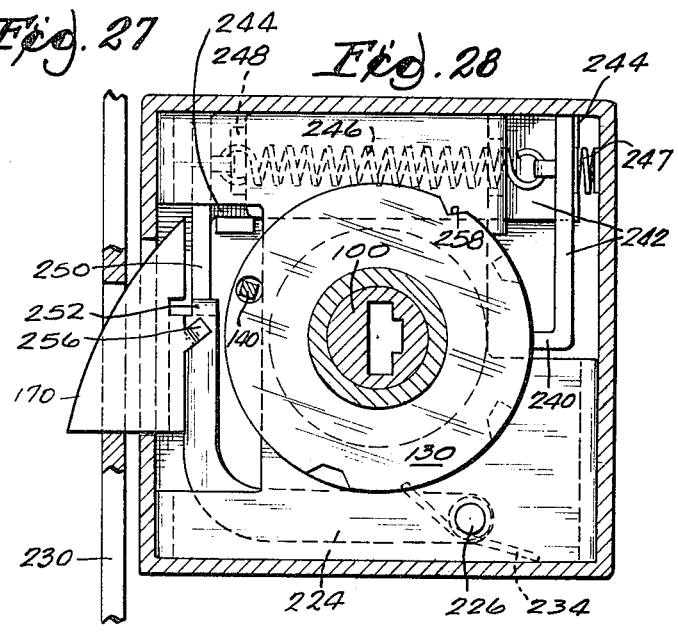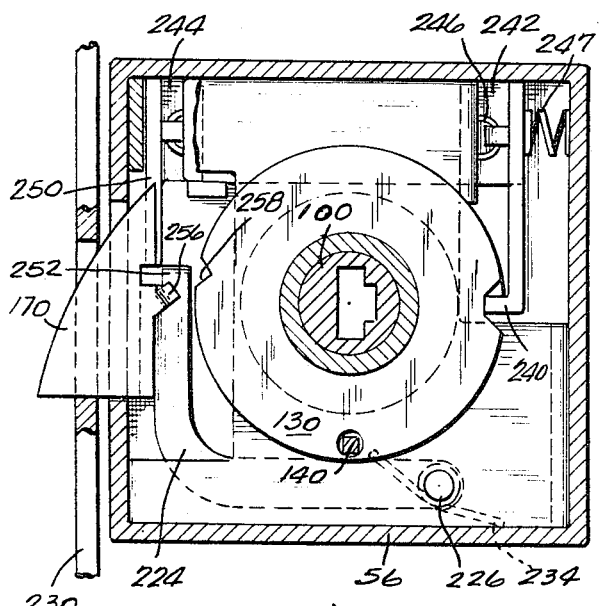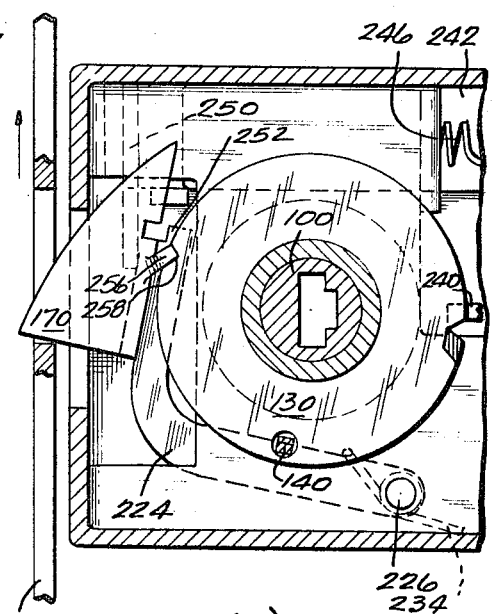

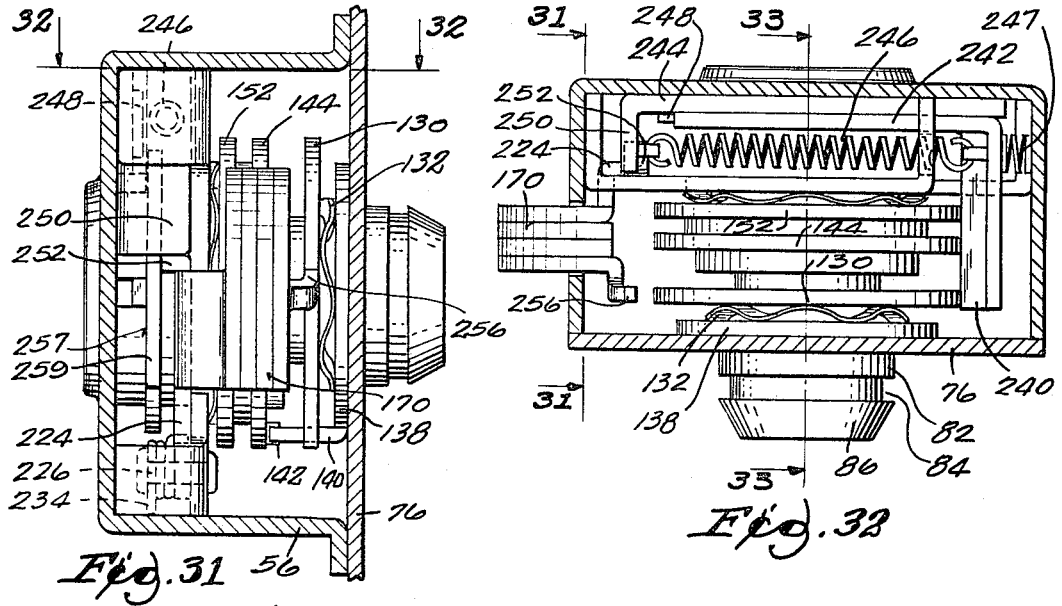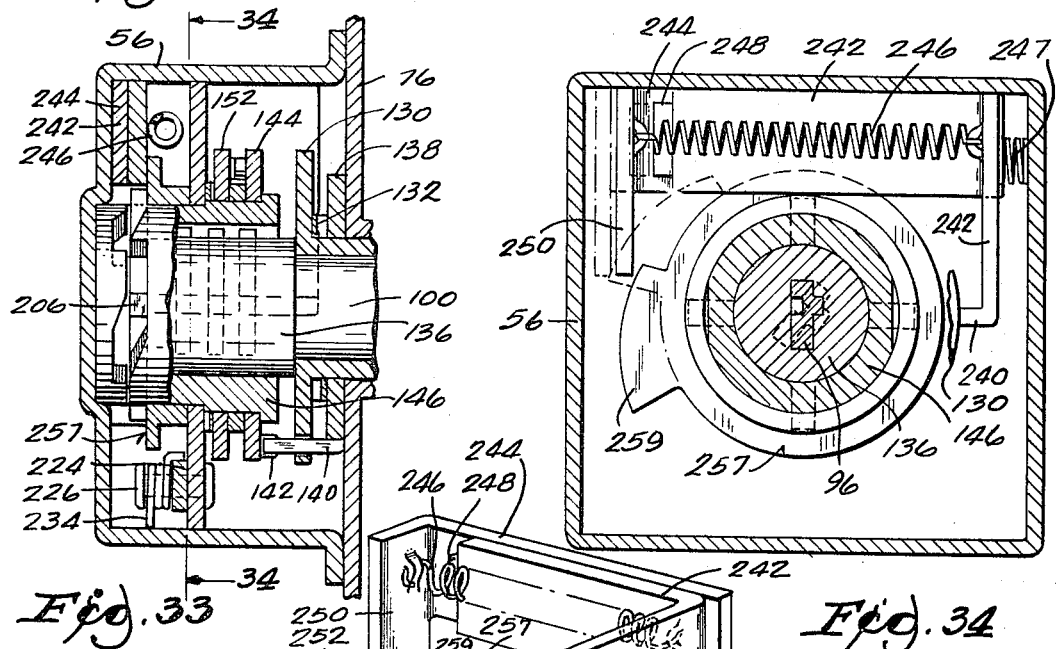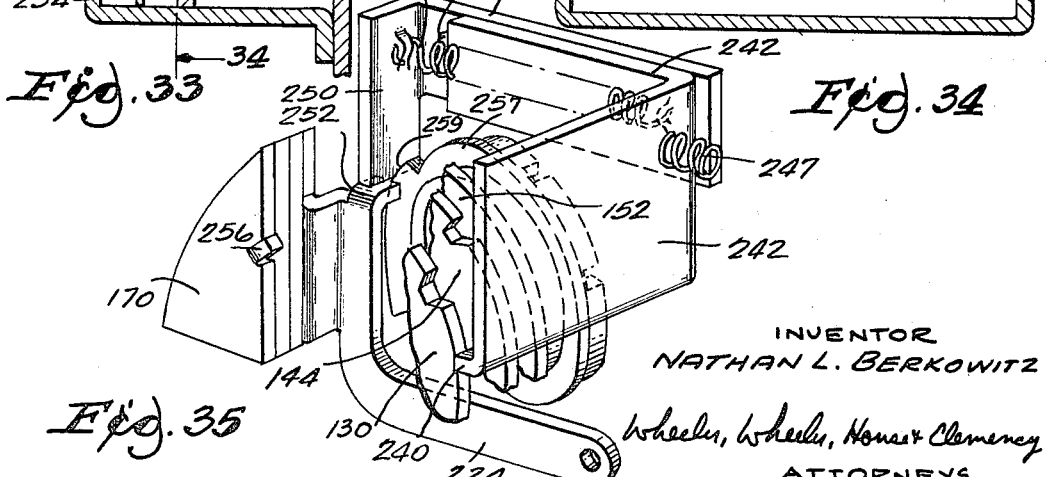

Aug. 6, 1968   N. L. BERKOWITZ   3,395,557
KEY-OPERATED AND PERMUTATION LOCK WITH KEY-CONTROLLED
DISMOUNTING AND COMBINATION CHANGE
Filed Aug. 17, 1966   9 Sheets-Sheet 9
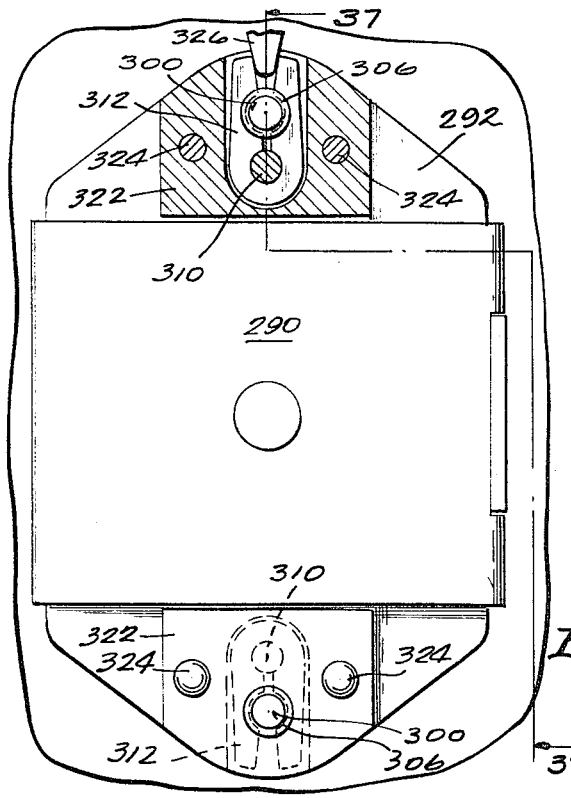
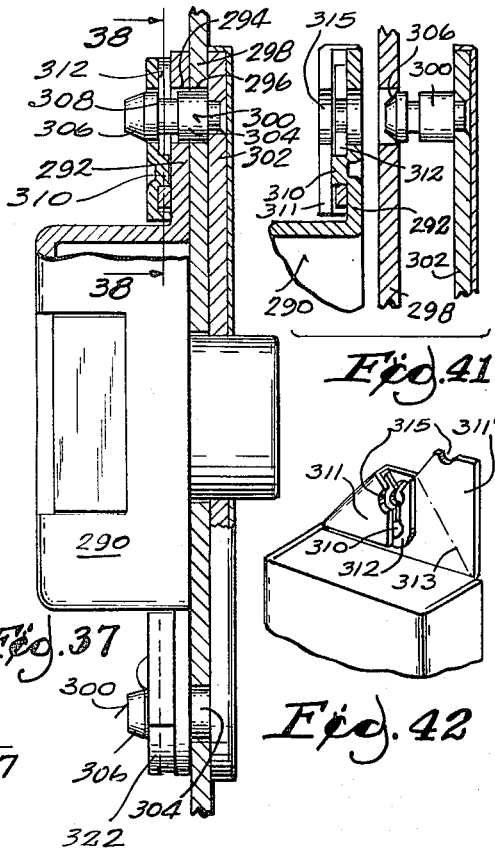
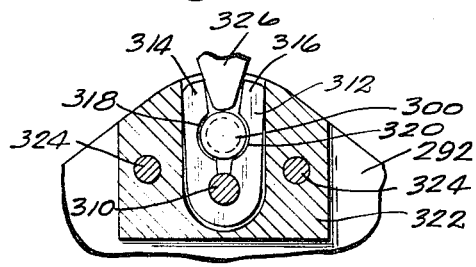
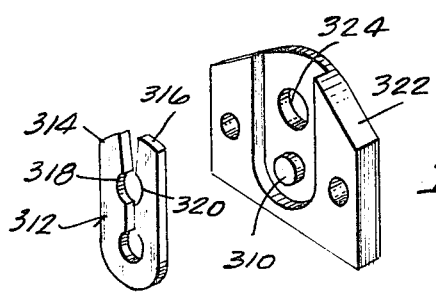
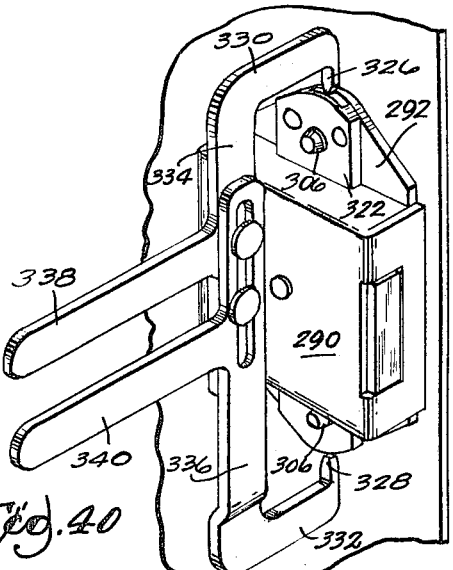
INVENTOR
NATHAN L. BERKOWITZ
BY Wheeler, Wheeler, House & Clemency
ATTORNEYS

United States Patent Office 3,395,557
Patented Aug. 6, 1968

3,395,557
KEY-OPERATED AND PERMUTATION LOCK WITH KEY-CONTROLLED DISMOUNTING AND COMBINATION CHANGE
Nathan L. Berkowitz, 4762 N. Cumberland Blvd., Milwaukee, Wis. 53211
Filed Aug. 17, 1966, Ser. No. 572,949
24 Claims. (Cl. 70—285)

ABSTRACT OF THE DISCLOSURE

A permutation lock, also operable with a master key, comprises cases on opposite faces of a door and connected by means which is also key operable for the removal of the cases from the door. The same key used to open the lock and to disconnect the dial from the permutation mechanism is also used to permit the combination to be changed.

---

The permutation mechanism operates in generally conventional manner but is especially designed to permit mounting and dismounting of its case and the control case. The two cases are disposed at opposite sides of a door and detachably connected to the door by means susceptible of key manipulation. Nuts, bolts and other fastening devices commonly used are completely eliminated.

The invention contemplates that the same key which may be used to open the lock can be used to manipulate the dismounting structure and can also be used to change the combination if the lock is a permutation lock. Unlike previous key operable permutation locks, the instant device permits the combination to be changed without opening the door. In order that the key may perform these several functions, it is axially movable as well as rotatable in both directions. In one direction of rotation, the key opens the lock. In the other direction of key rotation, either of two operations may be performed. The parts are displaced by the key to permit of combination change by manipulation of the knob. When such displacement occurs, it is also possible to disconnect the control case from the lock case and to leave both freely separable from the door. This feature is applicable both to key-operated locks and to those which are primarily permutation locks.

Without the key, the combination is fixed. The combination cannot be displaced without the key, either during shipment or on the door. Relative movement between the knob and the permutation mechanism is not spring controlled; the relationship is positively fixed and may be varied only by positive displacement as effected by the key. Moreover the combination is visible during assembly on the door.

The control case has a fixed dial and the shell of the case comprises the hub of a manually rotatable bezel. Rotation of the bezel operates the permutation mechanism. The arrangement is desirable because the operator's hand inherently shields the dial to conceal the combination from bystanders.

The dial is bodily displaceable with respect to the bezel and carries a tool for manipulating the latch which detachably connects the two cases to each other through the door.

For combination change, the permutation mechanism is manipulated by the key to be bodily retracted axially from a dirver which is operated by the bezel. This permits reengagement of the permutation mechanism and driver in a different angular position to establish a new combination. Such retraction is effected by a cam mechanism which is inoperative during normal opening of the lock by the master key but becomes operative if the key is rotated in a direction opposite to that required for opening the lock. Lost motion in the cam permits this mode of operation.

The various embodiments herein disclosed include locks which act directly to bolt the door to a jamb and locks which act indirectly to restrain movement of a dead bolt. Also included are permutation locks with master keys, locks which are key-operated only, and locks using the novel mounting means above referred to but in which a separate tool rather than the key is required for dismounting manipulation of such means.

As compared with prior art combination-changing devices in which a key merely conditions the lock for a manual operation which disconnects the permutation disks from the dial, the instant device uses backward rotation of the key to effect such separation without requiring manipulation of any separate part.

The specific mechanism herein disclosed and claimed produces an unusually compact organization operable in this manner. The structure has other advantages over prior art practice in that the bezel surrounding the relatively non-rotatable dial serves as what may be called a knob to function in such manner that the mere act of grasping the bezel will screen the combination from observers.

The mounting and dismounting feature is believed to be of particular value both in the form in which it may be actuated by the key and in the form in which a separate tool is required for manipulation. The structure permits locks to be mounted and replaced with much less time and expense than have heretofore been required. The parts are automatically doweled to the door when mounted and are securely held until released for dismounting.

Description of the invention

In the drawings:
FIG. 1 is a front elevational view of a lock embodying the invention, portions of a door and its jamb being fragmentarily illustrated.
FIG. 2 is a rear elevational view of the parts shown in FIG. 1.
FIG. 3 is a plan view of the parts shown in FIGS. 1 and 2, with the door and jamb shown in section.
FIG. 4 is a view in axial section on an enlarged scale through lock and control housings in mutually separated position at opposite sides of a door fragmentarily illustrated in section.
FIG. 5 is a similar view in section showing the housing assembled to the door, a key being illustrated in a separated position.
FIGS. 6–8, inclusive, are views taken in section on the line 6—6 of FIG. 5 showing the parts in different positions of operation, certain parts being shown in section and other parts being broken away.
FIG. 9 is a view taken on line 9—9 of FIG. 5.
FIG. 10 is a diagrammatic view of the lock plug and cylinder in perspective.
FIG. 11 is a view similar to FIG. 5 showing the key in position for removal of the lock and control cases from the door, the key being in place in the lock and parts being broken away.
FIGS. 12 and 13 (sheet 1) are views taken in section on line 12—12 of FIG. 11 and showing the parts in different operating positions, portions being broken away.
FIG. 14 (sheet 4) fragmentarily shows the lock parts as in FIG. 5 with the key in place preliminary to combination changing operation.
FIGS. 15 and 16 are views taken on the line 15—15 of FIG. 5 and showing the parts in different positions which they assume in the course of key controlled unlocking operation.
FIG. 17 is a view in axial section through a lock casing with lock parts embodying the invention being shown in plan.

FIG. 18 is a view taken in section on line 18—18 of FIG. 17.

FIG. 19 is a view taken in section on the line 19—19 of FIG. 17.

FIG. 20 is a view taken in section on the line 20—20 of FIG. 15.

FIG. 21 shows in axial section a non-permutation embodiment of the invention in which separate keys are provided for normal manipulation of the lock and for manipulation thereof for dismounting purposes.

FIG. 22 is a view in side elevation fragmentarily illustrating the lock plug and the longer key for dismounting.

FIG. 23 is a view taken in section on line 23—23 of FIG. 21.

FIG. 24 is a view taken in section on the line 24—24 of FIG. 21.

FIG. 25 is a view taken in section on the line 25—25 of FIG. 21.

FIG. 26 is a view taken in section on the line 26—26 of FIG. 21.

FIG. 27 diagrammatically illustrates in section (similar to FIG. 6) on a reduced scale a lock of the present invention for a dead bolt, the door and jamb being fragmentarily illustrated.

FIG. 28 is an enlarged detail view in transverse section through the lock of FIG. 27 showing the engagement of the lock bolt with the dead bolt, parts being broken away.

FIG. 29 is a view similar to FIG. 28 showing the parts in different relative positions.

FIG. 30 is a view similar to FIGS. 28 and 29 showing the parts in different relative positions.

FIG. 31 is a view in axial section through the embodiment of FIGS. 27 to 30.

FIG. 32 is a view taken in section on the line 32—32 of FIG. 31.

FIG. 33 is a view taken in section on the line 33—33 of FIG. 32.

FIG. 34 is a view taken in section on the line 34—34 of FIG. 33.

FIG. 35 is an enlarged diagrammatic detail view fragmentarily illustrating in perspective the relationship between the bolt and the permutation disks of the lock shown in FIGS. 31-34.

FIG. 36 is a view partially in elevation and partially in section showing a modified embodiment of the invention and mounted on a door which is fragmentarily illustrated.

FIG. 37 is a side elevation of the parts shown in FIG. 36, with the parts being broken away to the section indicated at 37—37 in FIG. 36.

FIG. 38 is a detail view in section on the line 38—38 of FIG. 37.

FIG. 39 shows in perspective the component parts illustrated in FIG. 38 as they appear in mutually separated positions.

FIG. 40 is a view in perspective showing a lock mounted as in FIG. 36 and FIG. 37 and showing a tool applied for the dismounting of the lock.

FIG. 41 is a fragmentary detail view similar to a portion of FIG. 37 and showing a modified spring mounting arrangement.

FIG. 42 is a fragmentary diagrammatic view in perspective showing on a reduced scale the manner of completing the assembly shown in FIG. 41.

Although the locks here disclosed are of general application, several of the embodiments are specifically designed for use on doors of storage lockers of the like. In FIGS. 1, 2 and 3, the door is shown at 50 and the jamb at 52. It will be noted that optionally the door may somewhat lap the jamb so that there is no crevice through which the latch bolt 54 can be reached for unauthorized opening.

*Detachable mounting on door*

The invention contemplates that in a device of this kind two separate cases shall be provided on opposite sides of the door. These are detachably connected with each other through the door. At one side is the lock case 56 and at the other side is a control case 58. The latter may comprise the hub of an operating bezel 60 which is rotatable with respect to the dial 62 for manipulation of the permultation disks in a manner hereinafter described. The bezel is fixed to the hub and the hub has an inturned flange 64 anchored in the groove of ring 66. This ring is welded or otherwise secured to a mounting plate 68 demountably clamped against the face of the door 50 and held in proper orientation with regard to the door by one or more dowel bosses 70 engaged in apertures 72 provided in the door. Optionally, the mounting plate 68 may have a finishing ply 74 laminated thereto as shown in FIG. 5.

The lock case 56 is similarly mounted on a plate 76 to which it may be attached in any desired manner, as by rivets 78. This plate is likewise held tightly to the door and has bosses 71 which are similar to bosses 70 and engaged for doweling purposes in the same openings 72 with which the door is provided.

Intermediate the doweling openings 72, the door has a larger opening at 80 for the lock mounting and operating parts. Closely fitted to the opening 80 is a sleeve 82 which may be integral with the mounting plate 76 for the lock case. This sleeve projects completely through the door and through a corresponding opening in the plate 68 of the control case. Adjacent the outer surface of plate 68, the sleeve is formed with an annular groove 84, beyond which the sleeve is conically beveled at 86 (see FIGS. 11–13).

The mounting plate 68 for the control case has fixed to it as by means of peg 88 a detent device 90 in the form of a split ring which is contractile and normally engaged in the annular channel 84 as shown in FIG. 12. When so engaged, it will hold the mounting plates 68 and 76 connected to each other and in clamping engagement with opposite faces of the door as shown in FIG. 5. However, the split ring has a radially projecting lever 92 at its free end. When this lever is engaged, as by arm 94, and the arm is rotated clockwise as viewed in FIG. 12, the spring may be opened to disengage it from the sleeve 82, whereupon the parts may be separated as shown in FIG. 4, leaving the lock case 56 and the control case 58 entirely disconnected from the door 50. They may be reengaged by simply pushing them together, since the beveled surface 86 of the sleeve 82 will cam the detent spring 90 aside until it is registered with the channel 84. The spring will re-enter the channel to lock the casings to each other when the camming pressure is relieved by registration of the spring with the channel 84.

In this embodiment, the dismounting operation is performed by concurrent manipulation of the key 96 and the bezel or knob 60 in the manner shown in FIG. 11.

The normally non-rotatable dial 62 seats on shoulders 98 formed on the lock plug shank 100 by flat surfaces 102 which spline the dial against rotation respecting the plug. Normally, the dial is confined between bezel margin 106 and said shoulders 98 as shown in FIG. 5.

Yieldably mounted on the lock plug 100 is a disk 112 carrying posts 114 of such length as to bear against and support the dial 62. The annular spring 104 seated on shoulder 66 biases the floating disk 112 and dial 62 outwardly. Due to engagement of the dial 62 with the shoulder 98 of the lock plug 100, the dial may be pushed rearwardly away from the bezel margin 106 only under circumstances such that the lock plug 100 is itself movable rearwardly. One of the conditions under which this may occur will hereinafter be described and is illustrated in FIG. 11. As there shown, a special collar 108 encircles the key 96 and abuts the shoulder 110 of the key. This collar acts as a spacer so that if the lock plug moves rearwardly, the dial 62 will be constrained to move with the plug against the bias of spring 104.

The arm 94, which opens the split ring detent 90 as above described, is mounted on the disk 112. Normally, this arm is out of contact with the free end 92 of the spring detent (FIG. 14) but when pushed rearwardly, it moves into the plane of the free end 92 of the detent (FIG. 11).

The disk 112 is peripherally keyed to the control case 58 which serves as the hub of bezel 60. Interiorly, the rotatable member 58 is provided with ribs 118. The floating disk 112 has radially projecting lugs 120 engaged with these ribs (FIGS. 11 and 14). Thus, when the key 96 and collar 108 are used to push the disk 112 rearwardly to engage its arm 94 with the end 92 of the detent spring 90, a clockwise rotation of the bezel 60 releases the spring by moving it from its closed position of FIG. 12 to its open position of FIG. 13, thereby freeing the control case and lock case from the door to permit separation thereof as shown in FIG. 4.

*Operation by permutation disks*

With the lock casing and control casing connected together in clamping engagement with an intervening door as above described, the locking bolt of any of the permutation lock mechanisms herein disclosed may be actuated to retracted position either by manipulation of the ring or knob 60 or by means of an appropriate master key. Operation through the permutation disks is as follows:

The rotation of disk 112 from the bezel ring 60 has already been described. The disk 112 is splined to the hub portion 58 of the ring 60 by means of the radial teeth 120 and the ribs 118. Connected directly axially from disk 112 is a driving finger 124 which, in the normal position of the parts shown in FIG. 5, extends along the plug disk 100 and is selectively engaged in any one of a number of terminal notches 126 in the end of a driven sleeve 128 which encircles the spindle 100 and is rotatable with respect thereto. Sleeve 128 extends through, and is rotatable in, the sleeve 82 of plate 76 above mentioned. In FIG. 12 the notches 126 are designated A, B, and C for identification of the available combinations.

Within the lock case 56 the sleeve 128 is provided with a disk 130 which is urged by a spring 132 against the shoulder 134 at the end of lock plug 136. The plug is of slightly larger radius than its spindle 100. Spring 132 seats against the disk 138 to hold it against the mounting plate 76 notwithstanding axial displacement of sleeve 128 and disk 130, such as may occur under certain circumstances hereinafter to be described. The disk 138 carries actuating arm 140 which passes through an opening 141 in the disk 130 whereby rotation of sleeve 128 and disk 130 is communicated to the arm 140. Disk 138 merely supports arm 140 for rotation.

The arm 140 acts as the first permutation driver. As best shown in FIG. 4 and FIG. 5, the end of arm 140 is in the plane of the lug 142 carried by permutation disk 144. This disk is rotatably mounted on the lock barrel 146. It also carries a driving lug 148 in a plane for engagement with driving lug 150 of another permutation disk 152 rotatably mounted on the barrel 146. The spring 154 holds the disks 152 and 144 and the intermediate thrust member 156 in a compact sequence against the stop shoulder 158 of the lock barrel 146. The spring 154 is seated against the partition 160 in the lock case 56, which is also abutted by the shoulder 162 of the lock barrel 146. Thrust member 156 is keyed to barrel 146 which has two flattened sides (see FIG. 10). This secures thrust member 156 against rotation. The objective is to eliminate transmitting rotating motion between the permutation disks 144 and 152.

In FIGS. 6–8, the lock casing 56 is shown in cross section. Within it is reciprocable a slide 168 which carries the bolt 170. A convoluted spring 172 is confined between one end of the casing 56 and the end of the slide 168 to bias the slide to the left as viewed in FIGS. 6, 7 and 8, whereby to project the bolt 170 into operative locking engagement with the door jamb as best shown in FIGS. 2 and 3.

Three permutation disks 130, 144, 152 have been disclosed. Any desired number may be provided. The several disks have peripheral notches such as those shown at 174, 176 and 178 in FIG. 6. When these notches are axially aligned, the arm 180 will enter the aligned notches under the bias of its operating spring 182 as shown in FIG. 7. Pending such alignment, the arm is supported on the periphery of one or more of the disks as shown in FIG. 8.

The arm 180 is pivoted at 184 to a cam plate 186 and biased toward the axis of the plug by means of spring 182. This plate is normally in the position shown in FIGS. 6 and 7. FIG. 17 shows the arm 180 projecting through an opening in the partition 160 to a position for interaction with the several permutation disks as above described. This view also shows the pivotal connection at 184 between the arm 180 and the cam plate 186.

The cam plate 186 is provided at 188 (FIGS. 6–9) with a lug engaged behind the flange 190 on the margin of slide 168. When engagement of the arm 180 in the several notches of the permutation disks permits motion from the bezel to be transmitted through such disks and through the arm 180 to the cam plate 186, such motion is communicated by lug 188 to the slide 168 to retract the bolt.

When the operator releases the torque he is exerting on the bezel 60 to effect the movement above described, the spring 172, acting on the retracted slide 168, causes the slide to move sharply from right to left as viewed in FIGS. 6–9, whereby to advance the bolt 170 and to oscillate the plate 186 from its FIG. 8 position to its FIG. 9 position, thereby throwing all of the permutation disks out of the positions which they had to assume to permit the bolt to be retracted. This destroys the set-up combination.

Since the lock bolt 170 is beveled as shown in FIG. 3, it will readily be pushed aside for door closing purposes by engagement with the jamb 52. There is no positive connection between the parts of the permutation lock to preclude freedom of movement of the slide and bolt as the bolt is retracted by an external force for reengagement with the jamb as shown in FIG. 3.

The operation of the lock by means of the master key will now be described.

*Opening door by master key*

All door opening operations are effected by rotation of the cam plate to retract slide 168 as above described. Whether the cam plate is rotated through the permutation disks or through the use of a key, the result is the same so far as retraction of the slide and the bolt is concerned. The manner in which a key may be used for this purpose is as follows:

The hub 190 of cam plate 186 turns freely on the fixed cylinder 146 of the tumbler lock. Cylinder 146 is secured against rotation by means of the flat sides 192 (FIG. 10) which engage in a complementary opening in the partition 160. Internally, the cylinder 146 has the usual pockets 194 into which the ends of the tumblers 196 are normally projected by the usual compression springs 198 (FIGS. 9). The tumblers are reciprocable transversely of the rotatable plug 136 and have the usual wards 200 and notches 202 which may be engaged by an appropriate key 96 which has complementary wards and slots adapted, when inserted into the plug, to retract the several tumblers from the cylinder pockets 194 and to align their ends with the periphery of the plug to permit the plug to rotate within the cylinder in a conventional manner.

When the key is withdrawn, the tumblers lock the plug to the cylinder to preclude rotation of the plug. When the key is inserted to retract the tumbler, the key may be used to rotate the plug. Behind the partition 160, the plug carries fingers 206 which, upon rotation of the plug, engage lugs 208 on cam plate 186 for the rotation of the cam plate for lock bolt retraction. The direction of plug rotation required for the key-retraction of the bolt 170 is clockwise as viewed in FIGS. 6–10. Since these views are looking toward the rear of the assembly, the rotation of the plug by the key which will open the lock would also be clockwise as viewed in FIG. 1.

For purposes hereinafter described, the fingers 206 at the rear of the plug may also be moved counterclockwise, in which case they are cammed between the opposing cam surfaces 210 and 212 (FIGS. 4, 5, 11 and 15 to 20) to draw the entire plug rearwardly. In the use of the key to open the lock as above described, the fingers 206 move between parallel surfaces 214 and 216 which are of limited angular extent. Consequently, no axial displacement of the plug is involved (FIGS. 4 and 5).

Use of key for changing combination

If the key 204 is placed in the plug to retract the tumblers and permit plug rotation as above described, and if the plug is then rotated counterclockwise instead of clockwise, the fingers 206 at the rear end of the plug move angularly between the cam surfaces 210 and 212 to retract the plug bodily. The cam surfaces 210 are provided by a member 220 carried by the back wall of the switch case (FIGS. 4 and 5). The cam surfaces 212 are formed on the rear end of the non-rotatable cylinder 146.

In connection with the provisions for change of combination, there are two important features unique in the present lock. In the first place, the various possible combinations are fully exposed and apparent to the operator, as indicated by letters A, B, C, D and E, who can readily make a selection from them when the component parts of the lock are disassembled as shown in FIG. 4. Selection is made by choosing the particular notch 126 with which the driving finger 124 is engaged in the course of assembly. In the second place, once the lock parts are assembled as shown in FIG. 5, it is impossible for the combination to be changed either by accident or design without the use of the key. This is important because of the possibility in some prior locks that the combination might become changed accidentally due to shocks encountered in shipment or might be changed deliberately by a blow on the projecting end of the plug so that a person by whom a previously used combination is known could restore the lock to the known combination so that he could gain access to the locker.

In the instant device, the only way to change the combination of the assembled device is by the key-induced rotation of the plug counterclockwise to cam the plug bodily rearwardly to disconnect the permutation disks from the driver so that the combination may be changed. Otherwise, the driving and driven elements are held in assembly by the cam mechanism, which positively holds the plug and driven member against rearward movement. Since the driving finger cannot move outwardly, separation to permit of combination change requires use of the key.

The effect of camming the plug rearwardly is to disconnect it from the bezel to permit independent rotation of the bezel or knob to present a new combination. As the plug 136 moves rearwardly during counterclockwise turning of the key, the permutation disk 130 will follow the plug due to the bias of the spring 132, which will hold the disk in continued contact with shoulder 134 on the plug. The dial 62 and disk 112 will be freed of rearward pressure and will therefore remain in their forward position. The rearward movement of the plug is shown in FIG. 14 to have disconnected the notched hub 84 of permutation disk 130 from the driving finger 124 of disk 112. With the key firmly held at its limit of counterclockwise movement, and the parts 124 and 126 disengaged, the bezel or knob 60 may be rotated to register the driving lug 124 with a different notch 126 to effect a new combination when the parts 124 and 126 are reengaged by rotation of the key clockwise to its original position. The informed operator will know how many points on the dial to turn the bezel in order to achieve whatever combination he desires within the capacity of the device.

As already stated, when a similar operation is performed with the collar 108 on the key as shown in FIG. 11, it will cause lug 94 of disk 112 to release the locking spring and to disengage the component cases from the door. In such an operation, the combination is not changed because the collar 108 requires the disk 112 to move with the hub 84 of the first permutation disk to maintain the driving connection between the bezel and such disk 130.

Dead bolt operation (FIGS. 27–35, sheets 7 and 8)

The embodiment shown in FIGS. 27–35 incorporates features which are not necessarily limited to use with a dead bolt. They may be used alternatively in the type of lock previously described. The bolt 170, instead of being mounted on a slide, as in the embodiment previously described, is carried by a lever 224 for pivotal movement about the pintle 226 between the locked position of FIG. 29 and the retracted position of FIG. 30. Its movement to the retracted position is effected by manipulation of the locking bar 230 from the locked position of FIGS. 27–39 to the unlocked raised position of FIG. 30. In the locked position, bar 230 projects through an opening in the bottom of the door 50 into an opening 232 in the door jamb 52. When the combination is satisfied, the bar may be lifted manually to retract the lever 224 against the bias of spring 234.

The manner in which the permutation lock disks control this movement is best shown in FIGS. 32 and 35. The bezel 60 as shown in FIGS. 1–20 is identical for the dead bolt operation. Sleeve 82 carries the same permutation disk 130 subject to the rearward bias of spring 132. In like manner, the disk 130 guides the finger 140 carried by disk 138. The finger 140 interacts with lug 142 of permutation disk 144. Lugs on disks 144 and 152 interact as in the previously described permutation lock.

When the peripheral notches of the several permutation disks 130, 144 and 152 are out of alignment as shown in FIG. 35, bolt 170 cannot be moved. When the several notches are aligned, they will receive the flange 240 of a sub-slide 242 as shown in FIG. 29. The sub-slide 242 is reciprocable with slide 244 but the arrangement permits of independent reciprocation of slide 244 in opposition to the bias of tension spring 246. The tension spring normally holds slide 244 and the sub-slide with the latter engaging a stop 248 on the slide 244. The compression spring 247 urges the whole assembly to the left as viewed in FIGS. 34 and 35.

The main slide 244 has a depending arm 250 which normally overlies a projection 252 on the dead bolt lever 224 (FIG. 35). When the assembly of slide 244 and slide 242 moves to the left upon entry of flange 240 into the aligned notches of the permutation disks, the arm 250 clears the projection 252 to free the dead bolt and permit the locking bolt or bar 230 to be raised from the position of FIG. 29 to the position of FIG. 30. The door can now be opened.

The dead bolt has a combination upsetting finger 256 which engages a notch 258 in at least one of the permutation disks (FIGS. 29 and 39). The finger 256 will rotate the notched disk for a portion of one turn. Thus, when the dead bolt is raised by manipulation of the bar 230, the combination is upset so that, when the locker door is again locked, by downward movement of the bar 230, the locker cannot be re-opened except by further manipulation of the permutation mechanism (or by a key as hereinafter described).

As in the construction first described, the dead bolt lock may be opened with a key.

The cam 186 of the first embodiment is replaced in this device by the cam member 257 connected with the lock plug. The camming surface 259 is located in proximity to the arm 250 so that by rotation of the plug and cam in a clockwise direction as viewed in FIGS. 34 and 35, the slide 244 will be moved to the left independently of the sub-slide 242. The sub-slide cannot move because of engagement with the flange 240 with the peripheries of the permutation disks. However, the displacement of the main slide 244 against the bias of spring 246 well releases the lever 224 and dead bolt 170 to permit the door to be opened.

Key operated lock

The embodiment shown in FIGS. 21–26 has no permutation feature. For dismounting or any other special function, it may be provided with separate keys for the regular user and the custodian. As already discolsed above, the custodian's key may rotate in a different direction from that of the regular user so that the custodian alone will be able to dismount the lock. Alternatively, and as herein described, the lock may be provided with a long key and a short key. The key 260 shown in FIG. 21 is short. It acts only on the first two tumblers 196 and 197 (FIG. 25) to permit the plug 124 to rotate in the cylinder 146 in one direction only. The tumbler or tumblers 262 which are beyond the reach of the short key 260 are engaged in slots 264 as shown in FIG. 24 to permit limited angular rotation of the plug 124 in the cylinder 146 when the first mentioned tumblers 196 and 197 have been retracted. The effect of such limited rotation is to transmit motion from the plug to a cam member 257 which has a cam surface 259 for displacing stop flange 250. This permits the dead bolt lever 224 and the dead bolt 170 to be operated to bolt releasing position as already described.

When the longer key 261 is inserted as shown in FIG. 22, it not only retracts tumblers 196 and 197 but also retracts tumblers 262. The plug may now be rotated in either direction. If the plug is turned clockwise as viewed in FIG. 26, the projecting finger 270 enegages the offset end 272 of the detent spring 274, thereby releasing the spring from interlocked engagement with the flange 276 on sleeve 277. This permits the whole assembly to be dismounted from the door. Normally the detent spring holds the mounting plate 278 and the face plate 280 in clamping engagement with the door 282. As shown, the two plates are provided respectively with bosses 284 and 286 which nearly meet in apertures 288 with which the door is provided. These bosses dowel the plates to the door to maintain the desired positions of registration. Upon release of the detent spring, the face plate 280 and the housing mounting plate 278 are instantly separable from the door. Upon reassembly of these plates on the door, the spring 274 rides up the beveled surface 288 to snap behind the flange 276 of sleeve 277, thereby reestablishing the mounting assembly of the parts on the door.

Detent spring anchorages for conventional locks or the like

FIGS. 36–41 on sheet 9 show at 290 a device to be mounted. It is immaterial to the present disclosure what the device is. It may be a permutation lock or a conventional key-operated lock or the like, or some other device.

The device 290 is provided with a mounting plate 292 having one or more apertures 294 registering with openings 296 in the door 298. Engaged in these apertures are studs 300 mounted in a finish or escutcheon plate 302 on the outside of the door. These studs have portions 304 which pass through the apertures 296 in the door. Each stud is also provided with a tapered head 306 shouldered at 308 in a plane which is inside of the mounting plate 292 for the device to be mounted.

Either the said mounting plate 292 has a channel to receive the spring 312, or a separate channel plate 322 may be provided for this purpose. The channel plate has a boss 310 upon which is positioned the bifurcated detent spring 312 as best shown in FIG. 39. The resiliently separable legs 314 and 316 have complementary semicircular notches 318 and 320 which are normally engaged in the channel behind the shoulder 308 of stud 300. The structure is duplicated for each stud. To further confine the hair pin type of spring, while permitting its legs to separate against their inherent bias, I desirably provide for each spring a semi-enclosure. In the construction shown in FIG. 38, a separate retaining plate 322 is connected by rivets 324 with the mounting plate 292. When the tapered extremity of finish plate stud 300 is introduced through the aperture 296 of the door, it passes through a registering aperture 324 in the plate 322. Its tapered extremity 306 will then spread the legs 314, 316 of the detent spring until the legs snap shut behind the shoulder 308 to retain the parts in assembly.

In the construction shown in FIGS. 41, 42, no separate retaining plate is required. Instead, the mounting plate 292 of the device 290 is formed integrally to provide the boss 310 and further to provide integral wings 311 which are folded over the spring 312 to retain it on the boss. FIG. 42 shows one of the wings folded into position over the spring while the other one marked 311′ is still to be folded on the dotted line 313. The respective wings have notches at 315 to receive the tapered extremity 306 of the post 300. The only function of the wings 311 is to confine the spring 312 while permitting its legs freedom of movement to engage the channel of the said plate. Thus the wing 311 performs the same function, in this respect, as the retaining plate 322.

Since two such springs are used in the device disclosed and since these should be opened simultaneously, I have provided a special tool for the removal of this device. This tool comprises a pair of wedges 326, 328 on the ends of arms 330, 332. The arms are carried by slides 334, 336 respectively. A rivet and slot arrangement permits the slides 334 and 336 to have relative reciprocation when manipulated by the handles 338, 340.

With the wedges 326, 328 separated as shown in FIG. 40, the tool is applied and the handles are manipulated to force the respective wedges between the free ends of the legs 314, 316 of the detent springs 312 to open both such springs simultaneously, whereby the upper and lower ends of the device are simultaneously released.

The tool is obviously not required for mounting since the beveled extremities 306 force themselves between the legs of the detent springs. Thus the parts reach the locked position shown in FIG. 37 when they are merely pushed together.

I claim:

1. The combination with a panel provided with an aperture and having opposing faces with which the aperture communicates, of a casing member and a second member requiring to be mounted on said faces and connected to each other through the aperture, a connector on one of said members extending through the aperture and provided with a transverse channel, and a spring element connected with the other of said members and releasably engaged in the channel for connecting said members with each other and holding them to the panel, the connector comprising a stud on one of said members and said element comprises a bifurcated spring plate, the plate having free end portions resiliently engaged in the channel, and means for exerting force to separate the free end portions of the spring plate whereby to release them from the channel for the disassociation of said members from each other and from said panel.

2. A combination according to claim 1 in which the panel is a door and there is lock mechanism in said casing, means in the tubular connector for manipulating the lock mechanism, and motion transmitting connections from said last means to said element for the operation thereof in a direction to release from the connector channel the portions of said element which are engaged therein.

3. In a permutation lock, the combination of a permutation lock mechanism, a dial having means fixing it against rotation during normal lock operation, and a knob operatively connected with said mechanism for the operation thereof, said knob consisting of a bezel ring enclosing the margin of the dial and having means supporting it for rotation about the dial.

4. A lock according to claim 3 in which the lock comprises a casing and the bezel ring is provided with a mounting plate, and means for detachably connecting the plate and the casing.

5. A lock according to claim 4 in which an apertured door intervenes between the casing and the mounting plate, the casing having a sleeve extending through the door and the mounting plate and provided with a circumferential channel, said means for detachably connecting the casing and the plate comprising a latch spring connected with the mounting plate and having a resilient portion releasably engaged in the channel and serving to connect the casing and the mounting plate to each other and to the intervening apertured door.

6. A lock according to claim 5 in which the casing contains lock mechanism and the sleeve contains a lock operating device for manipulating said mechanism, said device being movable in the sleeve, the device and latch spring having portions engageable by a predetermined movement of said device for releasing the spring from the channel and thereby releasing the connection between the casing and the mounting plate and the door.

7. A permutation lock according to claim 3 in which said ring has a disk therein behind said dial, said disk having a hub portion and said lock including a complementary portion, the said portions being in releasably interlocked engagement for the transmission of motion from the ring to the lock hub portion.

8. The combination with an apertured door, of a lock casing and a mounting plate on opposite faces of the door and having means connecting them with each other through the door, lock mechanism in the casing, means rotatably carried by the mounting plate for actuating said lock mechanism, and a motion transmitting connection from said rotatable means to said connecting means and extending through the aperture to the door, whereby said connecting means is operable from the exterior of the door.

9. A combination according to claim 8 in which the means connecting the lock casing and the mounting plate includes a releasable detent, and a portion of the motion transmitting connection is selectively engageable with said detent in a direction for the release thereof, and means for moving the said portion into engagement with said detent, said portion being normally retracted therefrom.

10. The combination with a cylinder lock having a plug provided with tumblers normally engaged with the cylinder and having a tumbler-retracting key for the rotation of the plug, cam means for moving the plug axially in the cylinder in the course of plug rotation when the tumblers are retracted, means including a detent for the mounting of said lock and releasable for the dismounting of the lock, normally retracted means for the release of said detent, said last means being engageable with the detent when the plug has been moved axially by said cam means, and mechanism for manipulation of the detent releasing means when said last means is engaged with the detent for the manipulation of the detent to dismount the lock.

11. A combination according to claim 10 in which said lock includes permutation disks rotatable about the lock cylinder aforesaid, a knob having means coupling it with the first such disk, and a member connected with the knob and constituting a part of said coupling means and connected with the detent-releasing means, whereby the lock is dismounted by rotation of the knob following tumbler retraction by said key.

12. A combination according to claim 10 in which the lock includes a bolt, said plug having means for retracting the bolt upon rotation of the plug in one direction, the aforesaid camming means for effecting axial movement of the plug being operative in an opposite direction of rotation of the plug.

13. A combination according to claim 12 in which said permutation lock disks also comprise means for the retraction of said bolt.

14. A combination according to claim 10 in which the lock comprises first and secod tumblers, the cylinder having openings in which the first tumbler is engaged to preclude plug rotation and having a slot in which the second tumbler is engaged to permit plug rotation in one direction but not in the other unless the second tumbler is also retracted from said slot, the lock having keys of differing length for selectively retracting only the first plunger with one key and both plungers with the other key.

15. A key-operated lock comprising the combination with a retractable locking bolt, of a lock cylinder, a lock plug rotatable in the cylinder and adapted to receive a key, tumblers in the plug normally engaged with the cylinders and retractable upon the insertion of a proper key, motion transmitting means for retracting the bolt upon rotation of the plug in a predetermined direction, cam means for effecting axial movement of the plug in the cylinder upon rotation of the plug in the opposite direction, and means for using the axial displacement of the plug for effecting an adjustment of said lock.

16. A lock according to claim 15 in which the adjustment comprises the manipulation of a mounting with which the lock is provided and which is releasable upon the occurrence of said adjustment.

17. A lock according to claim 15 in which the said adjustment comprises a permutation-changing mechanism with which the lock is provided, said lock including permutation disk structure for the retraction of said bolt irrespective of its retraction by said plug.

18. A lock according to claim 17 in which the lock comprises a permutation disk, a driven member connected with said disk and having a plurality of notches, a driver having a lug normally engaged with one of said notches and selectively engageable with any thereof, a knob connected with said driver for manipulation thereof, and means whereby the cam-induced axial movement of said plug disengages the driven member from the driver, the driver being thereupon indepedently rotatable to register its lug with a selected notch of the driven member.

19. A combination permutation and key-operated lock comprising a housing provided with a forward wall having a bearing sleeve, a permutation disk having a hub rotatable in the bearing sleeve, a lock plug rotatable in said hub and provided with a key slot and with key retractable tumblers, additional permutation disks mounted rotatably on the lock cylinder, the several permutation disks having driving lugs engageable for the purpose of communicating motion from one to the other, dial means for the rotation of the first mentioned permutation disk, a retractable bolt, means on one of said successive permutation disks for the retraction of the bolt, means on the plug for the retraction of the bolt upon rotation of the plug in a predetermined direction, means providing cam slots at the rear of the casing, fingers on the plug guided in said slots, the slots having non-camming portions which are ineffective to produce axial movement of said fingers in a predetermined range of rotation of the plug in said one direction, the slots and fingers interacting to move the plug axially when the plug is rotated in a direction opposite to said one direction of rotation, and means effective upon axial movement of said plug for disengaging said first permutation disk from said knob, whreby the knob and said first disk are relatively rotatable to permit a change of combination, the said slot and finger means being re-engageable in a different relative angular position for operation of the first disk from the knob according to a new combination.

20. A lock according to claim 19 in further combination with means for preventing disengagement of the driving connection from the knob to the first permutation disk during axial displacement of the plug, a releasable mounting latch for the lock, and means whereby motion for the release of the mounting latch is transmitted to the mounting latch from the knob when the knob is rotated with the plug axially displaced and when the said means is effective for preventing disconnection of the knob from the permutation disk.

21. A combination permutation and key-operated lock for a locker door having an aperture, said lock comprising a lock casing having a mounting plate, a permutation-actuating bezel having a mounting plate, means for connecting said plates to each other when they are disposed at opposite sides of the door and comprising a sleeve on one of the plates provided with a circumferential groove, and a releasable latch connected with the other of the plates and normally engaged in said groove, a permutation lock mechanism having a hub rotatable in said sleeve, means providing a driving connection from the bezel to said hub, a key operable lock plug rotatable in the hub and having a key slot and tumblers adapted to be retracted upon insertion of a proper key, a cylinder with which the tumblers are normally engaged except when retracted, means mounting the cylinder non-rotatably in the lock casing, said permutation mechanism including disks rotatable about the cylinder, the several permutation disks having complementary lugs selectively engageable in a predetermined rotation of the respective disks, a bolt movable between locking and retracted positions, means on the lock plug for retracting the bolt when the plug is rotated in one direction, means for transmitting motion from a permutation disk for retracting the bolt, latch releasing means normally disengaged from the latch, means controlled by said key and lock plug for selectively engaging said last means with the latch when the plug is rotated in an opposite direction, and means operable only when the latch releasing means is engaged with the latch, said last means being controlled by said knob for actuating the latch releasing means in a latch releasing direction.

22. A lock according to claim 21 in which the casing has cam structure and said lock plug has complementary cam structure, the said cam structures of the casing and plug being beveled for interaction in one direction of relative rotation to effect axial movement of the plug with respect to the casing, the said means controlled by the key and lock plug for selectively engaging the latch-releasing means with the latch means including a part having operating connections from the plug which are actuated when the plug is axially displaced by said cam mechanisms upon rotation of the plug in said one direction.

23. A lock according to claim 22 in which the releasable latch comprises a bifurcated spring and having resiliently yieldable legs, the latch-releasing means comprising means for separating said legs to free them from said groove.

24. The combination with an apertured door panel, of a lock casing at one side of the panel, permutation lock mechanism in the casing, an actuating knob at the other side of the panel, axially disengageable parts respectively connected with the permutation lock mechanism and with said knob and adapted, when engaged, to transmit motion from the knob to the permutation lock mechanism, the relative rotation of said parts, upon preliminary axial disengagement thereof, serving to change the combination of the permutation lock mechanism, normally locked means for positively restraining the parts against axial separation whereby to preclude change of combination, and means comprising a removable key for unlocking said last mentioned means whereby to accommodate combination-changing relative rotation between said parts, said parts being relatively rotatable only by the use of the key.

References Cited

UNITED STATES PATENTS

| 2,770,964 | 11/1956 | Bigelow | 70—451 |
| 3,052,114 | 9/1962 | Foote et al. | 70—315 |
| 3,070,389 | 12/1962 | Baur et al. | 287—20 |
| 3,273,363 | 9/1966 | North et al. | 70—330 |

FOREIGN PATENTS

| 588,798 | 11/1933 | Germany. |

MARVIN A. CHAMPION, *Primary Examiner.*

ROBERT L. WOLFE, *Assistant Examiner.*